United States Patent [19]

Stevenson

[11] 4,144,901
[45] Mar. 20, 1979

[54] PROBE SYSTEM FOR CONTAINERS

[75] Inventor: James S. Stevenson, Oakland, Calif.

[73] Assignee: Terminator Products, Inc., Oakland, Calif.

[21] Appl. No.: 809,088

[22] Filed: Jun. 23, 1977

[51] Int. Cl.² .............................................. F16k 51/00
[52] U.S. Cl. .................................. 137/240; 134/166 R; 137/317; 137/587; 220/256; 220/319; 222/148; 222/400.7
[58] Field of Search ............. 15/345, 346; 134/166 R, 134/169 R; 137/205, 212, 238, 317, 321, 322, 323, 240, 587; 220/256, 258, 307, 319; 222/148, 400.7; 251/318

[56] References Cited

U.S. PATENT DOCUMENTS

| 226,180 | 4/1880 | Masury | 220/258 |
|---|---|---|---|
| 2,738,796 | 3/1956 | Chadwick | 137/587 |
| 2,801,039 | 7/1957 | Arneson | 220/307 |
| 2,869,328 | 1/1959 | Gibson et al. | 134/166 R |
| 3,065,885 | 11/1962 | Chatten | 137/212 |
| 3,348,734 | 10/1967 | Rice et al. | 222/400.7 |
| 3,360,153 | 12/1967 | Wheaton, Jr. | 220/256 |
| 3,361,152 | 1/1968 | Akers | 137/312 |
| 3,916,924 | 11/1975 | McGowan | 137/240 |

FOREIGN PATENT DOCUMENTS 1006223  9/1965  United Kingdom ..................... 137/317

Primary Examiner—Martin P. Schwadron
Assistant Examiner—G. L. Walton

[57] ABSTRACT

A probe system primarily for a container containing hazardous chemicals, involving a rinse channel for permanent installation in the bung opening of the container and providing a passageway for a drop tube, and a coupling head installable over the rinse channel and drop tube and providing independent flow connections from each to independent external connections.

15 Claims, 3 Drawing Figures

PROBE SYSTEM FOR CONTAINERS

My invention relates to a container closure and content disposing means, and more particularly to a probe system for containers and particularly those employed in the handling of hazardous chemicals.

Hazardous chemicals are customarily packaged and shipped in metal containers, which are hermetically sealed to prevent leakage and protect those handling them during shipment and sale.

When it comes to the user or consumer of the contents of such containers, he breaks the seal in the process of opening the container and invariably exposes himself to the risks of contact with the chemical by hand pouring the same from the container.

Such risks prevail particularly in the handling of pesticides and the like where the liquid material falls in the catagory of a hazardous chemical. In this connection, the pesticide is mixed with water in a mixing tank from which it may then be sprayed.

Also, in many areas, the law requires such containers be discarded when emptied of their contents, but must first be rinsed and the rinse liquid then be disposed of safely before the containers may be discarded in local dumps. Such rinsing additionally exposes the operator to risks attendant upon the handling of such material.

Among the objects of the present invention are:

(1) To provide a novel and improved probe system for containers employed in the handling of chemicals and particularly chemicals of a hazardous nature;

(2) To provide novel and improved probe system, particularly applicable for use in closed systems, to enable removal of hazardous pesticides from original containers with a minimal of risk to an operator;

(3) To provide a novel and improved probe system which shall enable safe handling by an operator of hazardous chemicals from original containers;

(4) To provide a novel and improved probe system which will, in part, be incorporated into the original container, handling chemicals and particularly chemicals of a hazardous nature;

(5) To provide a novel and improved probe system which will enable rinsing of a container following disposal of its contents, and without risk to an operator;

(6) To provide a novel and improved probe system which can be produced very economically;

(7) To provide a novel and improved drop tube as a component of the probe system of the present invention.

Additional objects of the invention will be brought out in the following description of a preferred embodiment of the same, taken in conjunction with the accompanying drawings wherein.

Figure 1:
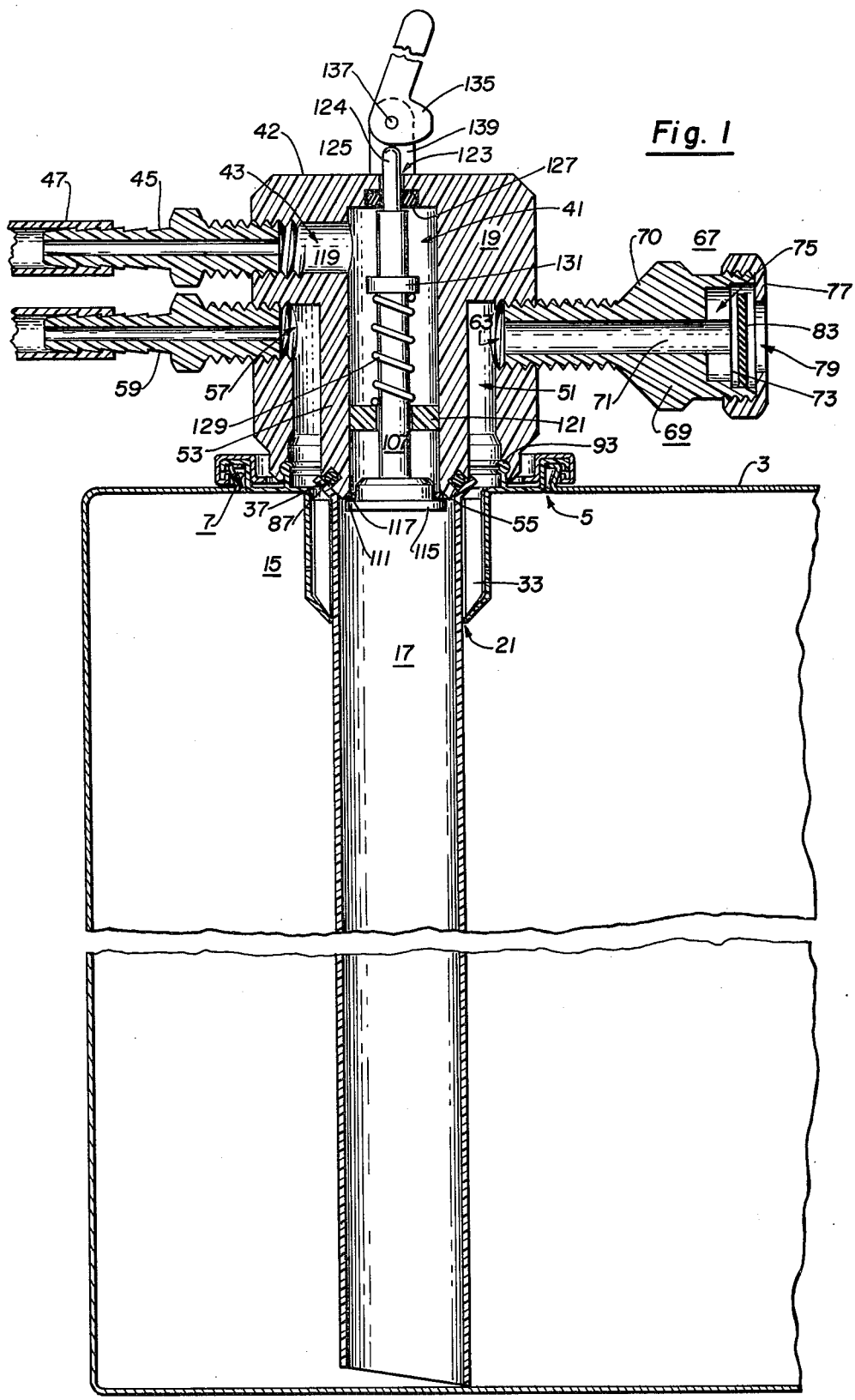
FIG. 1 is a fragmentary view, in section, of a container with the probe system of the present invention incorporated therein and ready for use.
Figure 2:
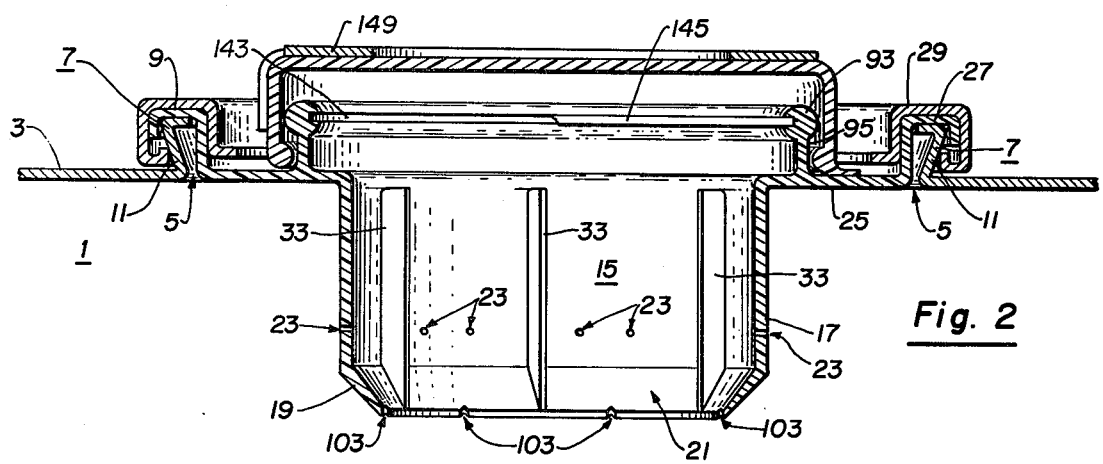
FIG. 2 is a fragmentary cross-section of a container with a portion of the probe system incorporated therein and with the container sealed and capped, ready for shipment and prior to its use by the user.
Figure 3:
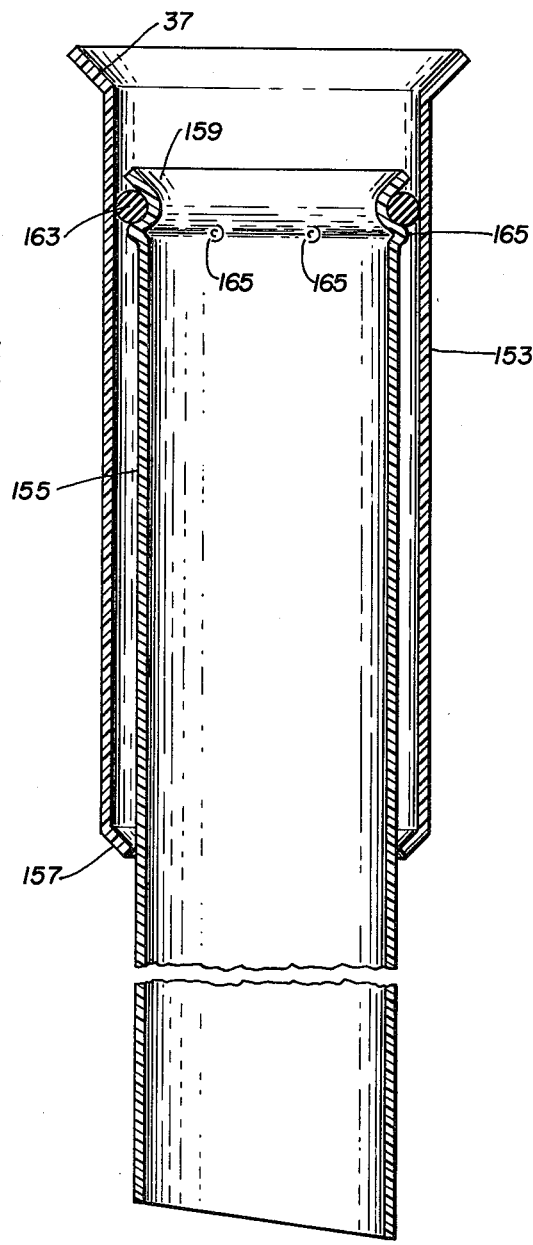
FIG. 3 is a view, in section, of a novel and improved drop tube for use in the probe system of the present invention.

Referring to the drawings for details of my invention in its preferred form, the probe assembly of the present invention is, in its preferred form, designed for use with a container 1, usually of thin sheet metal, having a wall 3, usually the top wall of the container, provided with a bung opening 5, the edge of which is bordered by an upstanding flange 7 of generally "Z" shape in section, to form a locking flange having an upper surface 9 and a recessed wall 11.

The probe system of the present invention, designed for use with such container, involves but three basic components, namely, a rinse channel 15, a drop tube 17, and a coupling head assembly 19 providing independent flow coupling connections to both the rinse channel and the drop tube, when the components are properly assembled.

The rinse channel 15 involves a cylindrical or conical outer wall 17 connecting along its lower edge with a narrow inwardly connected downwardly sloping bottom 19 defining a central opening 21. The wall has a plurality of spaced apart rinse openings 23 and, with the bottom, is supported as a unit by a lateral flange 25 extending outwardly from the upper edge of the channel wall and terminating in a rim 27 adapted to straddle the bung opening flange 7, to which it is secured by a locking ring 29 which is tightly crimped in place. Thus the rinse channel component becomes permanently installed in the can, in the preferred form of the invention.

The drop tube 17 is adapted to pass, preferably with a sliding fit, through the opening 21 defined by the rinse channel, and is guided axially through said opening by a plurality of guide ribs 33 extending radially from the outer wall of the rinse channel toward the drop tube location and terminating preferably just slightly short of engaging the tube when the tube is in place, so as to permit continuity of liquid in the channel about the tube.

The drop tube terminates at its lower end in an angular cut edge 35 to permit bottom contact without blocking entrance thereto, and is preferably formed with an upwardly directed angular flange 37 at its upper end, which flange is adapted to engage the upper corners of the rinse channel ribs, which thus function as stops.

Such engagement is assured by installation of the third component, namely, the coupling head assembly 19. This component comprises a coupling head which is generally cyclindrically with an axial passageway 41 up from the bottom, of a diameter comparable to that of the drop tube and extending to approximately but short of the upper end of the coupling head to create a roof 42. Such passageway will be in line with the drop tube, and by connecting with said passageway, a radial passageway 43 which terminates at its outer exposed end in a fitting 45 to receive a flexible tube 47, such tube may be connected to a source of vacuum to withdraw the contents of the can with minimum exposure to an operator.

Concentric with the axial passageway, is a passageway in the form of a circular channel 51, creating a cylindrical wall 53 whose lower end surface 55 is angled to complement the angle of the drop tube flange 37, so that the end surface of this cylindrical wall and the proximate surface of the drop tube can mate.

In such mating relationship, the concentric channel 51 of the coupling head will be in alignment with the rinse channel, and by providing a radial passageway 57 in the coupling head, in flow connection with the concentric channel, and installing a tube fitting 59 in the outer end of this radial passageway, such rinse liquid may be supplied from an external source, to the rinse channel, to be sprayed around the inside of the container via the rinse holes.

A similar radial passageway 63 from the concentric channel, terminates at its outer end in an air intake valve assembly 67 installed therein.

This air intake valve assembly involves a housing 69 in the form of a fitting 70 threaded into the end of the radial passageway and has an axial passageway 71 in communication with said radial passageway. At its exterior end, this fitting is recessed to provide a shoulder or floor 73 which has radial grooves 75 formed therein from the axial passageway outwardly. A closure 77 for the fitting has a vent opening 79 therein.

Within the fitting is a valve disc 83 of a size to just comfortably cover the vent opening when urged against the closure while resting edgewise on the inner wall of the fitting. If formed of soft rubber or equivalent flexible material, any excessive pressure developed in the system beyond the normally developed pressures, can then force the disc either partially or completely through the vent opening to thereby function additionally as a pressure relief valve.

Any movement of the valve disc against the shoulder or floor of the fitting will not block the radial passageway, because of the radial grooves and air intake under these conditions will prevail.

The engagement of the bottom of the cylindrical wall 53 with the flange of the drop tube serves to isolate the rinse passages from the discharge passages from the container.

An O-ring 87 installed in the drop tube engaging end of the cylindrical wall will serve to effectively seal this cylindrical wall to the drop tube and preclude any possibility of leakage between the rinse passages and such discharge passages from a container. By recessing the O-ring into a rectangular groove of a volume proximating that of the unstressed O-ring, surface to surface contact between the lower end of the cylindrical wall and the drop tube flange can be realized, to establish stability while still affecting sealing with the O-ring. If the material of which the coupling head is formed, is relatively soft or flexible, the O-ring may be dispensed with.

The coupling head assembly may be installed in any manner which will serve to maintain pressure engagement between it and the drop tube flange. Preferably, a snap lock arrangement is provided for this purpose.

Such snap lock arrangement may involve a circular bead 93 supported slightly above the upper surface of the rinse channel flange, by a narrow wall 95, such bead being concentric with the rinse channel.

The lower outer rim of the coupling head assembly is formed with an inwardly directed lip 99 adapted to snap about the circular bead 93 and removably lock the coupling head thereto, with the cylindrical wall of the coupling head in pressure engagement with the flange of the drop tube.

With the probe system thus assembled and coupled into a close system by means of the tubing coupled to the tube fittings, the contents of the container can be withdrawn from the container at will and with minimum risk to an operator, and upon emptying the container of its contents, rinse water can be directed into the container to rinse the container while the rinse liquid is withdrawn through the drop tube and deposited in a safe place, such as the mixing tank of a closed system.

As the contents of the container are being withdrawn via the drop tube, air must replace the liquid withdrawn. This function is performed by the air vent assembly, for during withdrawal of contents of the container, the resulting reduction in pressure within the container will manifest itself in the air vent assembly via the rinse openings, the circular channel in the coupling head and the radial passageway leading therefrom to the air vent assembly, with the result that the valve disc will be suctioned against the grooved floor of the air vent housing to permit entrance of air to the container.

Upon emptying the container, rinsing can be accomplished by introducing a rinse liquid, such as water for example, under pressure into the rinse channel where it will spray through the rinse openings against the surrounding walls of the container and removed via the drop tube for disposal.

Since, during rinsing, pressure will develop in the radial passageway to the air vent assembly, the valve disc will be urged into sealing relationship with the vent opening and thus block escape of rinse liquid at this point.

Should rinse pressure develop to a point where it might develop risks to the operator, the valve disc will buckle and emerge either partially or completely through the vent opening to relieve the pressure and develop a safe condition until the situation can be remedied.

A closed system to which the present probe system is applicable is disclosed in my copending application for Method And Apparatus For Preparing Chemical Solutions, Ser. No. 588,417, Filed June 9, 1975 now U.S. Pat. No. 4,092,993.

With the container completely rinsed and rendered substantially safe insofar as the presence of hazardous chemical residues are concerned, the coupling head may be removed and if desired, the drop tube may be withdrawn. In the process of withdrawing the drop tube, the contacting edge of the floor of the rinse channel will function as a wiper and remove any liquid or droplets of rinse liquid adhering to the tube following the rinsing operation.

The container having thus been cleansed, is now in condition to be disposed of safely.

If it should become desirable during rinsing, to preclude accumulation and retention of rinse water in the lower portion of the rinse channel, so as to reduce residual liquid in the container following the rinsing operation, one or more small notches 103 in the engaging edge of the bottom of the rinse channel will permit any rinse water collecting in the bottom of the rinse channel to drain off down the drop tube to the bottom of the container where it may be withdrawn through the drop tube with the rest of the rinse liquid.

The presence of such notches will have the added advantage that during rinsing, some of the rinse liquid will be sprayed directly onto the drop tube to assure direct action of the rinse liquid thereagainst.

Upon removal of the coupling head, dripping of rinse liquid therefrom is to be avoided, which liquid though now a highly diluted solution of the chemical from the container, might still be considered a hazard to be avoided. Accordingly, I provide a normally closed valve assembly 107 at the lower end of the axial passageway 41 of the coupling head, with means for opening the same upon installing the coupling head to a container.

Such valve assembly involves a valve seat 111 formed by beveling the inner corner of the cylindrical wall 53, and a valve comprising a disc 115 carrying an O-ring seal 117 in position to engage the valve seat.

The valve is provided with a valve stem 119 which slidably passes through a guide bar 121, which is installed transversely of the axial passageway 41, and slidably emerges through an opening 123 in the roof of the coupling head to present an exposed or protruding end 124. This opening is sealed by an O-ring 125 installed in a recess 127 about the stem as it passes through the roof opening.

The valve is normally urged to its closing position by a compression spring 129 installed about the valve stem, under compression, between the transverse guide bar 121 and a collar 131 affixed to the stem at a location above the guide bar.

The means for actuating the valve to its open position may be a manually actuable cam 135 in contact with the protruding end of the valve stem and carried by a shaft 137 supported between two standards 139, one to either side of the valve stem.

Frequently in the preparation of spray solutions involving pesticides and the like, only a portion of the contents of the container will be required at any one time and to avoid exposure of an operator to an open container following a removal of the coupling head for application to another container, it becomes desirable to seal the container.

With this in mind, an interior peripheral groove 143 is provided in the locking bead, which is adapted to receive a sealing disc 145 which may be readily snapped into place by reason of the inherent resiliency of the bead and supporting structure. Such inherent resiliency, by the same token, will facilitate removal of the sealing disc when it is again desired to withdraw some of the contents of the particular container. Additional protection may be afforded by a snap cap 149 adapted to be snapped over the bead to enclose the bead and sealing disc, and thus prevent unauthorized tampering with the sealing disc, or accidental contact therewith by external forces which might otherwise damage or dislodge the sealing disc from its installed position.

Such sealing disc and snap cap can also provide adequate protection to the container and its contents during shipment of the container, and thus, when so employed as original equipment in the shipping of such a container with its contents, the sealing disc and snap cap may be re-employed to temporarily seal the container when only a portion of the contents of the container are removed at any one time.

The rinse channel with its locking bead, when of plastic, may be molded so economically, as to render it disposable and, therefore, this component of the probe system of the present invention, as previously indicated, may become a permanent part of the container.

The drop tube, if of plastic, may also be produced so economically as to be rendered disposable and therefore may or may not be included in the container when shipped.

A few chemical pesticides, however, are more or less incompatible and most of the economical plastics and, if such plastic be submerged in such chemical for a substantial period of time, such as a year or more, the plastic may deteriorate.

Under such conditions, the use of drop tubes or plastic would not be desirable and drop tubes of this material would not be included in such containers when shipped.

In lieu thereof, drop tubes of stainless steel would be employable, but being rather costly and therefore not disposable, drop tubes of stainless steel could not economically be included in the containers when shipped, but would be inserted by the operator, who, because of the rinse feature incorporated into the probe assembly, could re-use such drop tube repeatedly, as the same would not be subject to wear or deterioration.

As for incorporating the plastic rinse channel into the container as a permanent part thereof, such component would not be submerged in the contents of the container as would a drop tube, as such containers are not shipped full but are of sufficient excess capacity as to provide head space sufficient to include the rinse channel. Any contact with the plastic of the rinse channel, due to splashing of contents which might otherwise be deleterious to the plastic, will not be sufficient to impair the function of the rinse channel, for deterioration can occur only after a substantial period of time and under conditions of continually submergence in such chemicals.

Since various containers of different capacities may be of like cross-section but of different depth, drop tubes of corresponding length may be employed so as to reach the bottoms of these various containers when installed therein.

As a feature of the probe system of the present invention, a drop tube of adjustable length is provided to accommodate the one drop tube to a range of depths. This may involve a pair of telescoping sections 153, 155, the upper one 153 of larger diameter terminating at its upper end in a flange 37 of the type previously described, and at its lower end may be provided with an inturned lip 157. The inner or slidable section 155 will be of smaller diameter, adapted to loosely slide through the opening formed by the inturned lip at the lower end of the upper section, while at its upper end, it is flared outwardly just sufficiently to leave some clearance with respect to the inner surface of the upper section, thus creating a loose fitting flange 159 to preclude loss or withdrawal of the inner section via the bottom of the outer section.

When assembled and inserted into a container of pesticide or other liquid, the inner section, as thus far described, will, due to gravity, drop into engagement with the floor of the container and thus automatically assume the proper length, and, if necessary to assure such dropping, spring pressure may be resorted to or the inner section may be weighted.

The floor engaging end of the drop tube may be angled as preciously described, to assure against sealing of the drop tube against the floor of the container.

As an alternative adjustable drop tube, I slidably seal the inner section with respect to the upper or outer section 153 by means of an O-ring 163 between the two component sections. Such an O-ring may be installed simply by slipping it over the inner section prior to inserting the inner section into the outer section or, as a alternative, the O-ring might be permanently fixed to the inner or outer section, to frictionally receive the opposing section when the two sections are assembled.

This may readily be accomplished by confining the O-ring between the flange 159 of the inner section and a plurality of protuberances 165 impressed in the wall of the inner section just below the flange 159.

When so slidably sealed, the drop tube, when put to use, is first slidably extended to its full length, prior to inserting the same into the container, whereby, upon subsequently inserting it into the container, the inner or extended section will first engage the bottom of the container, following which, application of pressure to the upper end of the drop tube, will force the upper section down until the angular flange engages the upper corners of the rinse channel ribs. In this manner, engagement of the drop tube with the floor of the container will be assured, following which the coupling head may be installed.

Should an operator desire to do some hand pouring, he will not use the drop tube and coupling head. In lieu thereof, a nozzle having a lip similar to that with which the coupling head is provided, may be utilized, in which case, it will be snap locked to the locking bead 93. When such nozzle is employed for hand pouring, those rinse channel openings not blocked by the discharging liquid, will admit air to the container.

From the foregoing description of the invention in its preferred form it will be appreciated that the same is subject to alteration and modification without departing from the underlying principles thereof, and I, accordingly, do not desire to be limited in my protection to the specific details illustrated and described, except as may be necessitated by the appended claims.

I claim:

1. In combination, a container adapted to contain a hazardous ingredient such as a pesticide, said container including a wall having a bung opening, and a probe system comprising a circular rinse channel outer wall and bottom within said bung opening and affixed to the rim thereof to constitute an integral part of said container, said channel outer wall having rinse openings therein, and said bottom defining an opening concentric with said channel outer wall for reception of a drop tube, a drop tube in such opening, and coupling means providing an outflow passageway from said drop tube to a point external of said container, for connection to a source of vacuum to withdraw such ingredient from said container, said last means also including a rinse passageway leading from an external connection fitting to said rinse channel, and an air intake valve assembly having an airflow passage therethrough connecting with said rinse passageway, valve means in said air flow passage responsive to a predominance of atmospheric pressure over pressure in said airflow passageway, to enable intake of air during normal withdrawal of the contents of said container when no rinse liquid is being supplied to said rinse passageway, said valve means being responsive to the rinse liquid during rinsing, for sealing said valve means against flow of rinse liquid therethrough.

2. A combination in accordance with claim 1 characterized by said rinse channel bottom sloping downward toward said drop tube and terminating in an edge in substantial wiping engagement with said drop tube, and at least one drain opening in said bottom.

3. A coupling head assembly in accordance with claim 1, characterized by said air intake valve assembly including an air vent and said valve means comprising a disc adapted to cover said vent in response to rinse liquid during rinsing.

4. A coupling head assembly in accordance with claim 3, characterized by said disc being of a size to comfortably cover said air vent and being sufficiently flexible to buckle through said air vent in response to pressure developed in said rinse passageway in excess of normally developed pressures.

5. A probe system component for a container adapted to contain a hazardous ingredient such as a pesticide, such container including a wall having a bung opening therein, said probe system component comprising a circular rinse channel, means for installing said channel in such container substantially concentric with the rim of such bung opening, said rinse channel defining a central opening therethrough for reception of a drop tube, and including an outer side wall and supporting means comprising a lateral flange extending outwardly from the upper edge of said side wall and terminating in means for securing said rinse channel to the rim of said bung opening, to effect a permanent installation of said rinse channel in such container.

6. A probe system component in accordance with claim 5, characterized by a circular wall on the upper surface of said lateral flange, concentric with said central opening, and a snap cap adapted to snap over said wall and with said flange, constituting means for closing such bung opening.

7. A probe system component in accordance with claim 6, characterized by said wall having an interior peripheral groove adapted to receive a sealing disc to seal the entrance to such can defined by said rinse channel.

8. For use with a container adapted to hold a hazardous chemical and including a wall having a bung opening, a coupling head assembly for installation in said bung opening, said coupling head assembly comprising a coupling head having a bottom portion for insertion into the bung opening of such container, a first passageway extending from said bottom portion through said coupling head and terminating at an external tube connection fitting, said passageway being adapted for flow connection with a drop tube in such container for enabling withdrawal of the contents of such container, a second passageway extending from said bottom portion through said coupling head and terminating at a different external tube connection fitting, said second passageway being adapted for flow connection with the container interior when said coupling head assembly is installed, an air intake valve assembly installed on said coupling head and having an airflow passageway therethrough connecting with said rinse passageway, valve means in said air flow passageway, responsive to a predominance of atmospheric pressure over pressure in said airflow passageway, to enable intake of air during normal withdrawal of the contents of said container when no rinse liquid is being supplied to said rinse passageway, said valve means being responsive to the rinse liquid during rinsing, for sealing said valve means against flow of rinse liquid therethrough.

9. A combination in accordance with claim 8, characterized by said air intake valve assembly including an air vent and said valve means comprising a disc adapted to cover said vent in response to rinse liquid during rinsing.

10. A combination in accordance with claim 9, characterized by said disc being of a size to comfortably cover said air vent and being sufficiently flexible to buckle through said air vent in response to pressure developed in said rinse passageway in excess of normally developed pressures.

11. In combination, a container adapted to hold a hazardous chemical such as a pesticide, said container including a wall having a bung opening, a probe system component comprising a circular rinse channel outer wall within said bung opening and means crimping said outer wall to the rim of said bung opening to constitute said rinse channel outer wall an integral part of said container, said rinse channel outer wall having rinse openings therein and providing a central passageway for supporting a drop tube in said container, removable means for sealing said bung opening for shipment of said container with said rinse channel wall so installed, and means, upon removal of said sealing means, for coupling said container in a closed system, said coupling means comprising a coupling head having a bottom for insertion into the bung opening of said container, a first passageway extending axially from said bottom through said coupling head and terminating at an external tube connection fitting, said first passageway being adapted for flow connection to said drop tube for enabling withdrawal of the contents of said container, a second passageway extending from said bottom through said coupling head and terminating at a different external tube connection fitting, said second passageway being adapted to flow connect with said rinse channel, an air intake valve assembly having an airflow passage therethrough connecting with said rinse passageway, valve means in said air flow passageway responsive to a predominance of atmospheric pressure over pressure in said air passageway, to enable intake of air during withdrawal of the contents of said container when no rinse liquid is being supplied to said rinse passageway, said valve means being responsive to the rinse liquid during rinsing, for sealing said valve means against flow of rinse liquid therethrough.

12. A combination in accordance with claim 11 characterized by means for removably capping said sealing means to protect the same.

13. A combination in accordance with claim 11, characterized by said means crimping said rinse channel outer wall to the rim of said bung hole, including an upstanding flange bordering the edge of said bung opening, a lateral flange extending from said rinse channel outer wall as a part thereof, a peripheral rim on said lateral flange, said peripheral rim straddling said upstanding flange, and a locking ring crimping said peripheral rim and said upstanding flange.

14. A combination in accordance with claim 11, characterized by said means for sealing said passageway through said rinse channel including a bead on the upper surface of said lateral flange and encircling the passageway through said rinse channel, said bead having an interior peripheral groove to receive a sealing disc, and a sealing disc installed in said groove.

15. A combination in accordance with claim 14, characterized by a snap cap installed over said bead to protect said sealing disc.

* * * * *